Oct. 25, 1932.    J. W. LEE    1,883,993
DRILLING MACHINE
Filed Nov. 26, 1930    8 Sheets-Sheet 4

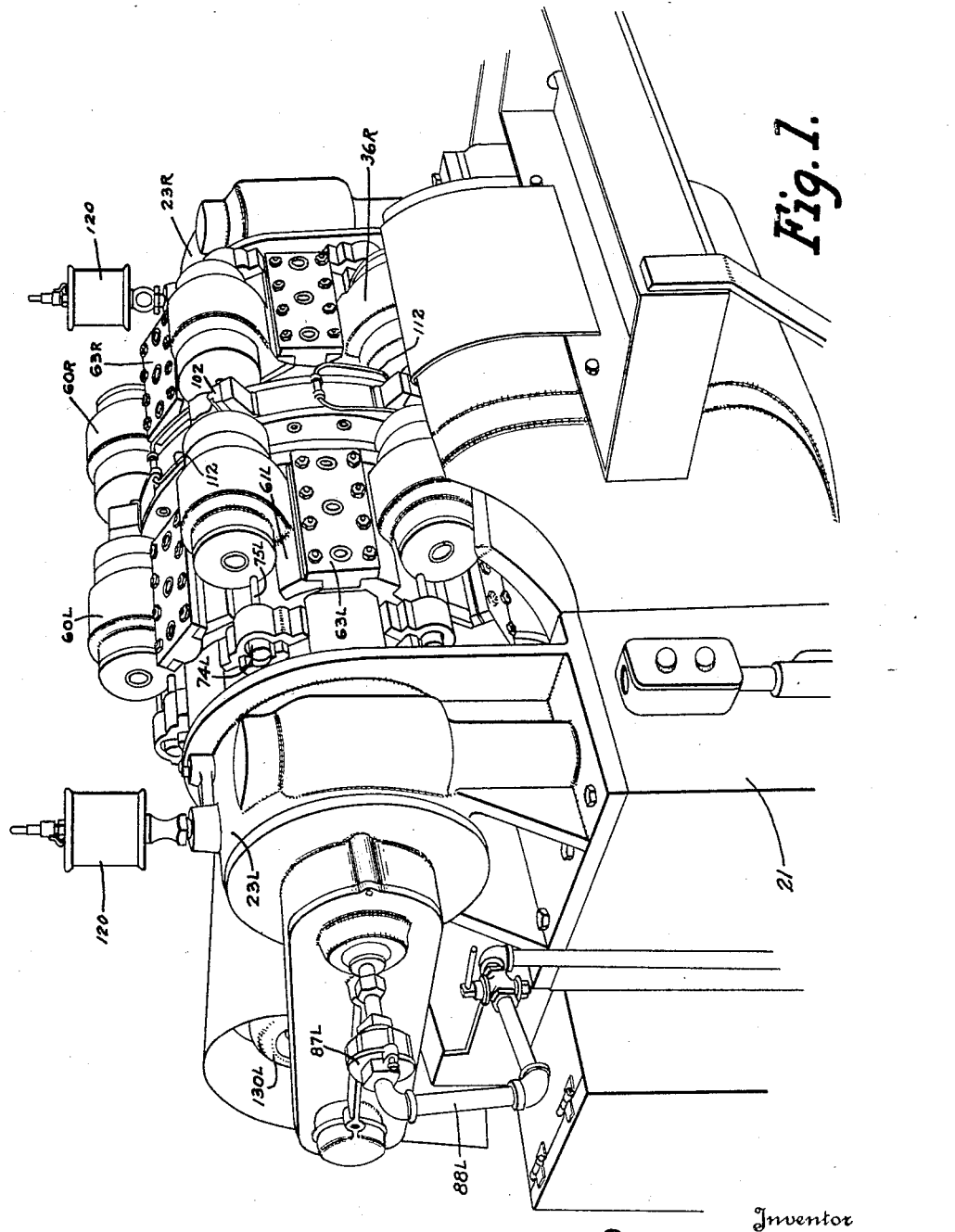

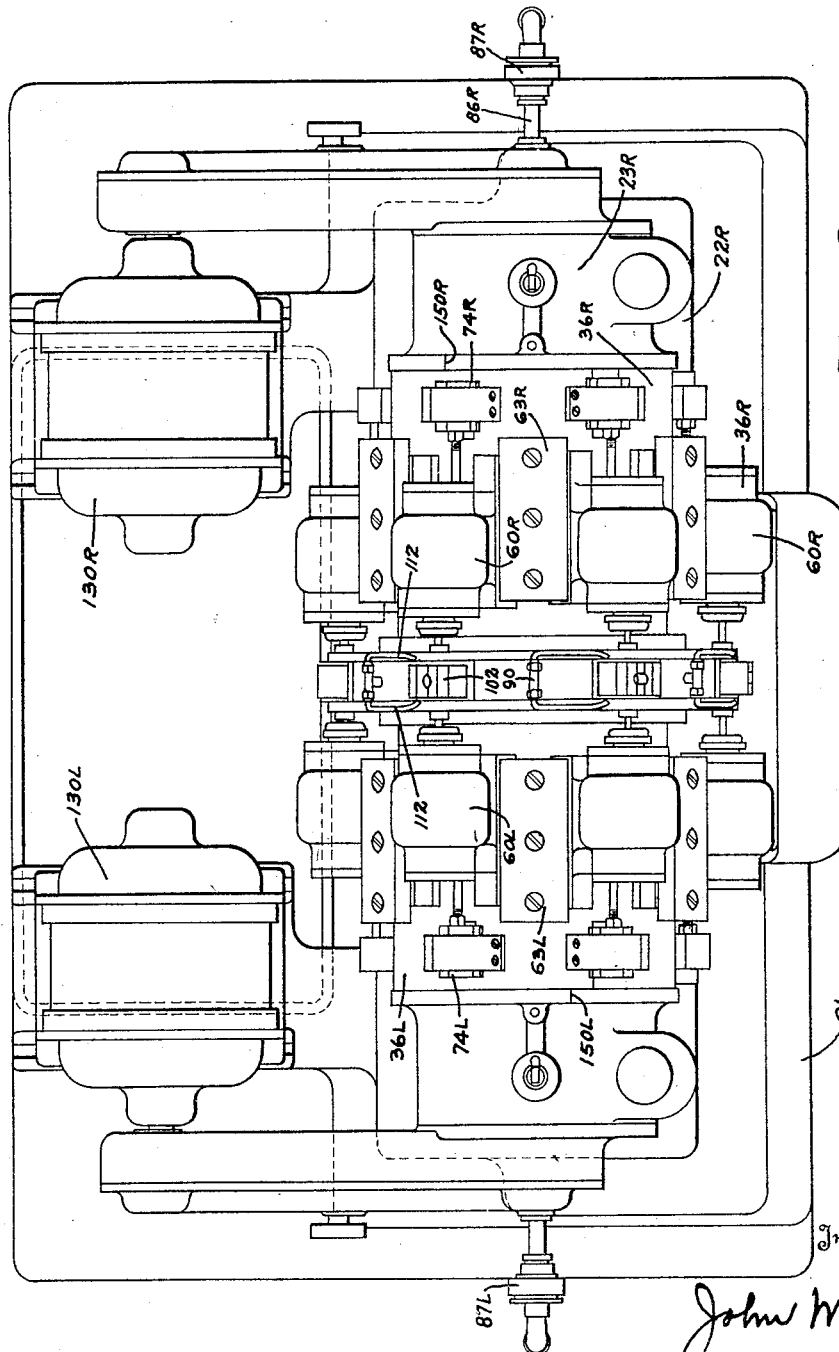

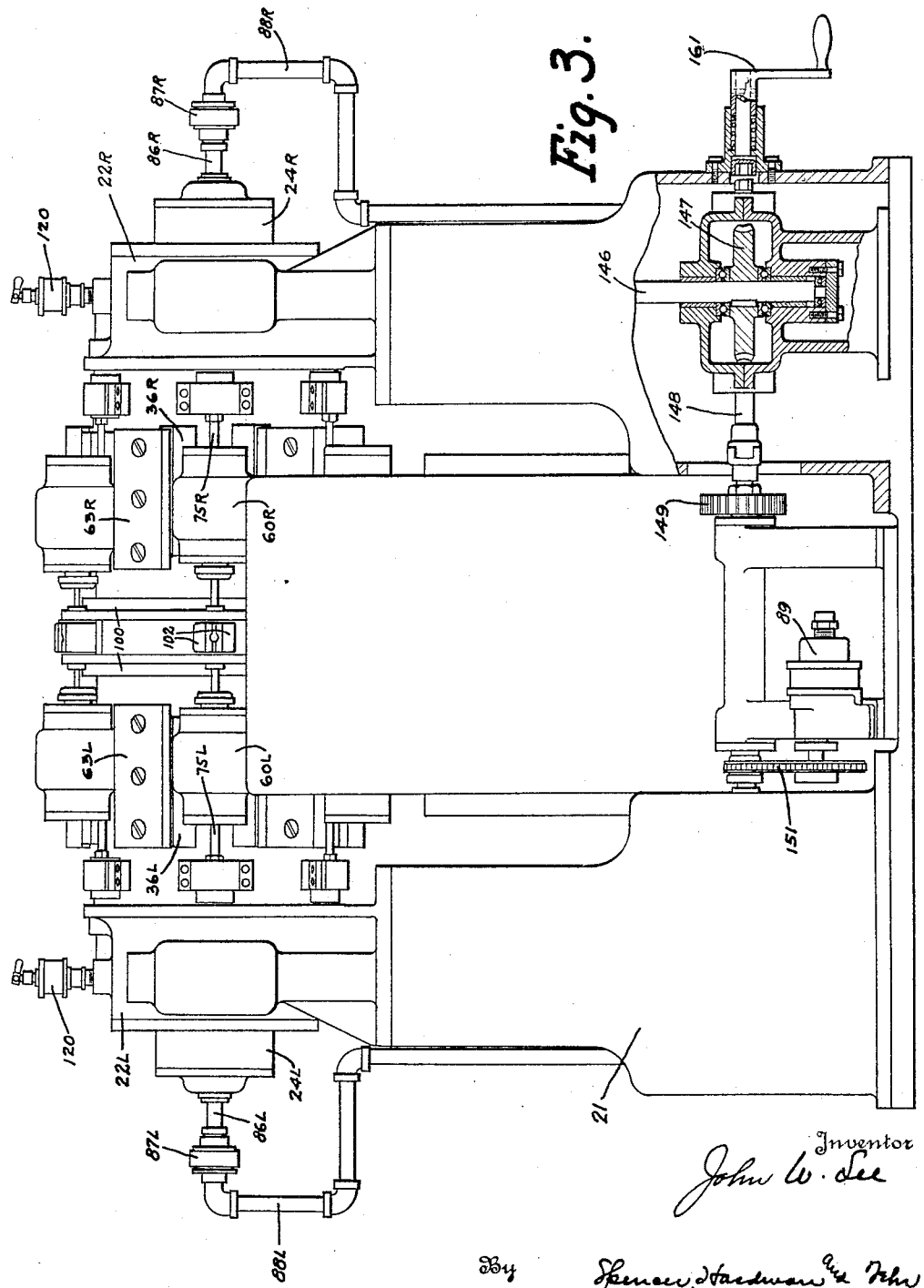

Inventor
John W. Lee
By Spencer, Hardman and Pehr
Attorney

Oct. 25, 1932.  J. W. LEE  1,883,993
DRILLING MACHINE
Filed Nov. 26, 1930   8 Sheets-Sheet 5

Inventor
John W. Lee

Spencer, Hardman and Ehr
Attorneys

Oct. 25, 1932.  J. W. LEE  1,883,993
DRILLING MACHINE
Filed Nov. 26, 1930  8 Sheets-Sheet 6

Inventor
John W. Lee

Spencer, Hardman and John
Attorneys

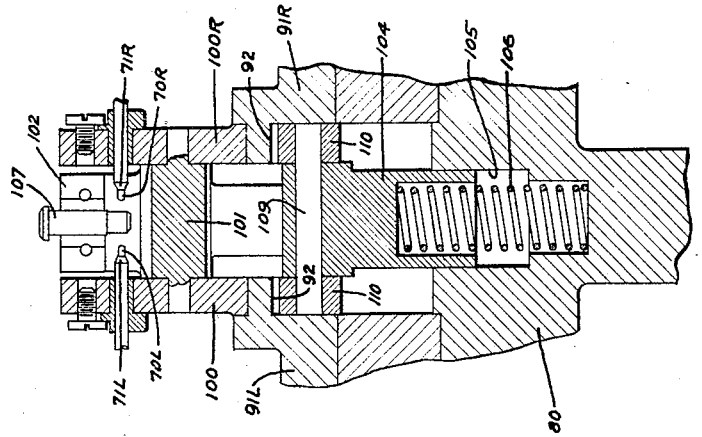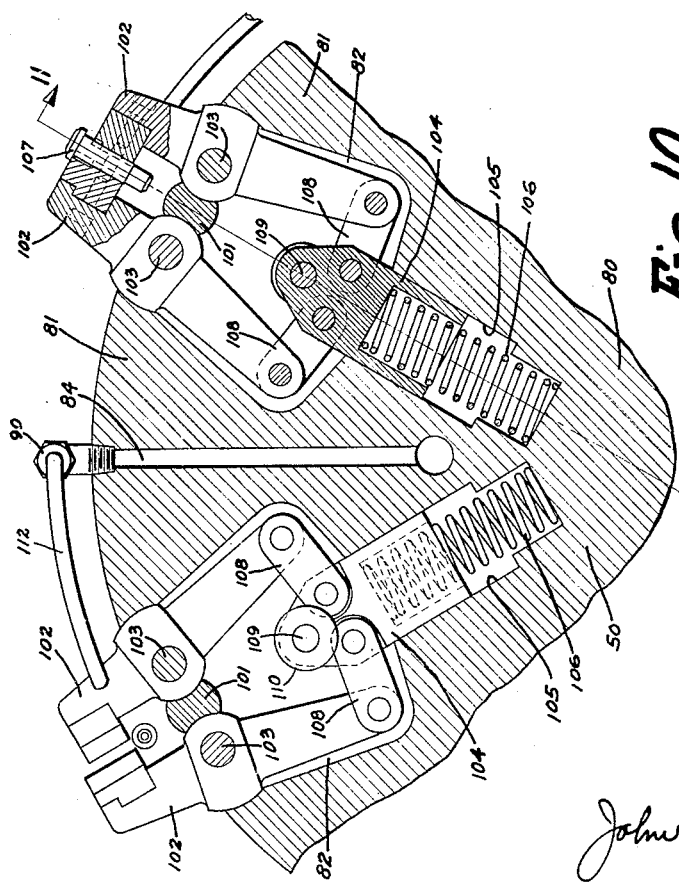

Patented Oct. 25, 1932

1,883,993

UNITED STATES PATENT OFFICE

JOHN W. LEE, OF DAYTON, OHIO, ASSIGNOR TO DELCO PRODUCTS CORPORATION, OF DAYTON, OHIO, A CORPORATION OF DELAWARE

DRILLING MACHINE

Application filed November 26, 1930. Serial No. 498,471.

This invention relates to improvements in drilling machines.

It is among the objects of the present invention to provide a machine adapted to drill a hole through a piece of work and chamfer both ends thereof.

A further object of the present invention is to provide an automatic drilling machine, capable of doing the work of a plurality of ordinary drill presses, and which requires the services of an operator for loading purposes only.

The above objects are attained in the present machine by providing two oppositely disposed drill heads, coaxially aligned, and movable longitudinally, control mechanism moving said drill heads toward each other substantially concurrently, said control mechanism, however, moving one drill so that it completes its portion of the hole through the work piece and starts to withdraw before the other drill cuts its portion of the hole to communicate with the first drilled hole portion.

Further objects and advantages of the present invention will be apparent from the following description, reference being had to the accompanying drawings wherein a preferred embodiment of one form of the present invention is clearly shown.

In the drawings:

Fig. 1 is a fragmentary perspective view of the improved drilling machine.

Fig. 2 is a plan view of the machine.

Fig. 3 is a front view of the machine, a portion thereof being broken away more clearly to illustrate certain interior mechanism.

Fig. 10 is an enlarged fragmentary sectional view of the chuck controlling mechanism.

Fig. 11 is a detailed sectional view taken substantially along the line 11—11 of Fig. 10.

Figure 5:
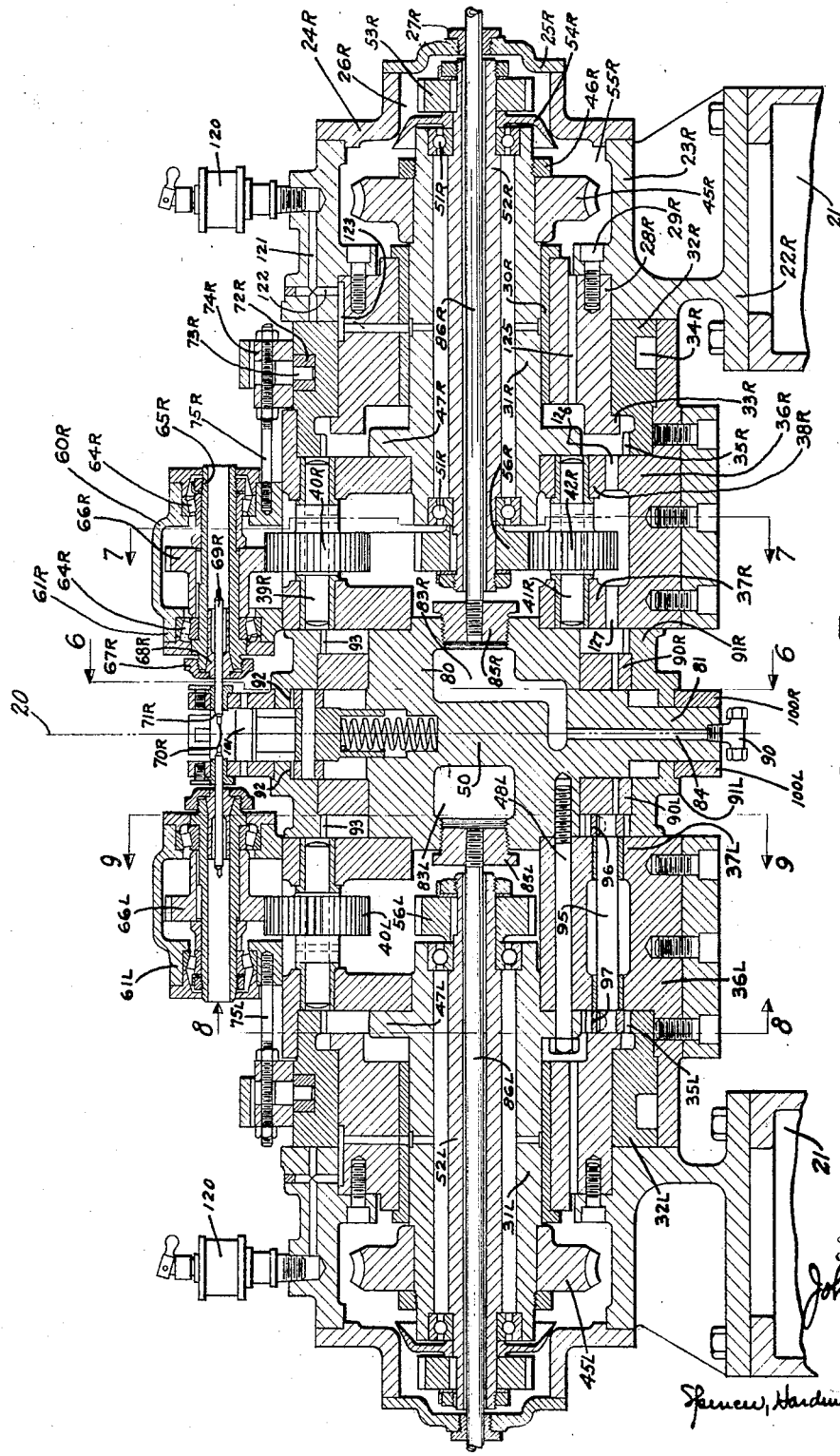
Fig. 5 is a longitudinal sectional view of the machine taken substantially along the line 5—5 of Fig. 4, the base portion of the machine being broken away.

Referring particularly to the Fig. 5, it will be seen that the portions of the machine on each side of the center line 20 are substantially identical and therefore, for the sake of brevity, only one side thereof will be described detailedly.

Figure 7:
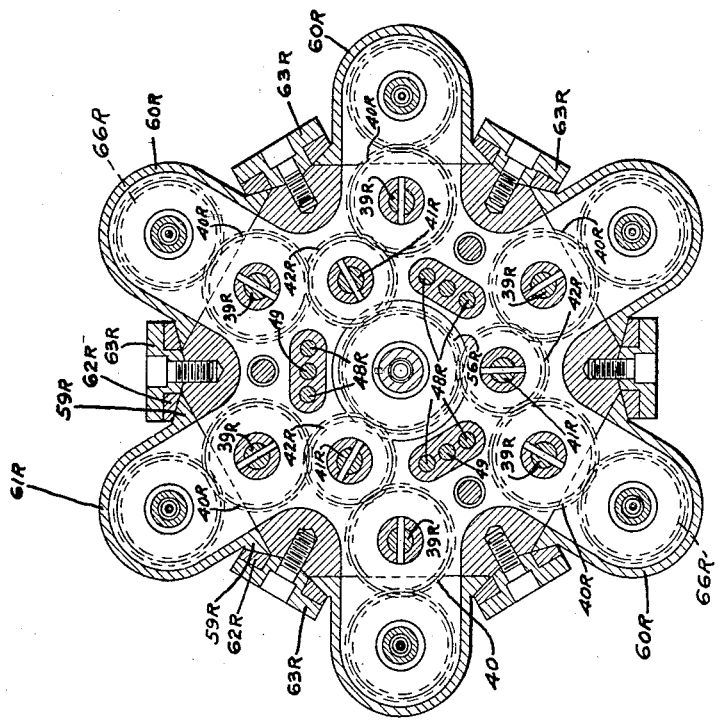
Fig. 7 is a view similar to Fig. 6, taken substantially along the line 7—7 of Fig. 5.

Referring particularly to the portion of the machine to the right of the center line 20, whose parts will be designated by reference numerals carrying the suffix R, meaning "right", 21 designates the main base portion carrying an end frame 22R comprising a cylindrical housing portion 23R. This end frame 22R is properly spaced from the center line 20 of the machine. Its outer, open end has a cover consisting of portions 24R and 25R forming a chamber 26R. A bushing 27R is screwed into a central opening in portion 25R, this central opening being substantially coaxial of the cylindrical housing portion 23R. The inner end of the end frame 22R has a recess into which a bearing sleeve 28R snugly fits. The bearing sleeve 28R is secured to the stationary end frame 22R by screws 29R. This bearing sleeve carries a bearing 30R which rotatably supports a hollow shaft 31R. A ring 32R fits about the bearing sleeve 28R and is clamped upon the stationary end frame 22R by an outwardly extending, annular flange 33R provided at the outer end of the bearing sleeve 28R. The ring has an annular cam slot 34R in its outer peripheral surface, adjacent the end of the ring which engages the end frame 22R. At the end more remote from the end frame member the ring is provided with an internal gear 35R. The ring 32R provides a bearing supporting the carriage 36R. This carriage has spaced wall portions 37R and 38R. Co-axially aligned holes in the said wall portions 37R and 38R of the carriage 36R are provided with bearings in which shafts 39R are journalled. In the Fig. 7 is will be seen that six of these shafts are supported between the walls 37R and 38R in a circular row, equally spaced from each other. Each shaft 39R supports a gear 40R. Other aligned holes in the walls 37R and 38R are provided with bearings in which shafts 41R are journalled. These shafts each support a gear 42R. The shafts 41R are arranged in a circular row and so spaced that the gears 42R, supported thereby, each mesh with two adjacent gears 40R respectively. This is clearly illustrated in the Fig. 7.

The shaft 31R mentioned heretofore as being journalled in the bearing 30R of the end frame member 22R, has a gear 45R secured thereto which is driven by a power means, to be described. This gear is attached to the shaft 31R in any suitable manner, a collar 46R, screwed upon shaft 31R, preventing its accidental removal. Shaft 31R has an outwardly extending, annular flange 47R which has a plurality of openings therein, in properly spaced relation for receiving the headed ends of the bolts corresponding to bolts 48L. It will be understood that a series of bolts 48L extend through openings in the flange 47L of the shaft 31L as well as flange 47R of shaft 31R. These bolts 48L are shown in Fig. 5 and the corresponding bolts 48R are not shown due to the direction in which the section in Fig. 5 is taken and also due to the staggered relation between the right and left bolts for purposes to be described. Bolts 48R and L are provided in pairs and between each two adjacent bolts there is provided a locating dowel pin 49 as illustrated in Fig. 7. As shown on the left side of the center line 20 of Fig. 5, bolts 48L pass through channels in the carriage 36L and are screwed into threaded openings provided in the hub member 50 of the machine. The same is true also of the bolts 48R which, though not appearing in the right side of the sectional view 5, pass through similar channels in the carriage 36R and screw-threadedly engage the hub member 50, thus tying together the hub member 50, the carriages 36R and 36L and the hollow shafts 31R and 31L and thereby causing these parts to rotate in unison. In order to avoid twisting torque, the shaft 31L is provided with a driving gear 45L corresponding to the driving gear 45R.

In each end of the tubular shaft 31R a roller bearing 51R is provided, the inner race each of said bearings 51R rotatably supporting a tubular shaft 52R within the hollow shaft 31R. The one end of the tubular shaft 52R extends beyond the one bearing 51R into the chamber 26R and has a driving sprocket 53R secured to it within this chamber so that said shaft 52R is driven by said driving sprocket. Shaft 52R carries a disc providing an oil thrower 54R which rotates with the shaft 52R and substantially prevents any lubricant within the chamber 55R of the end housing 22R from leaking out through the bushing screw 27R in the end cover of the end frame. At the inner end of the shaft 52R there is secured a gear 56R, which, as shown in the Figs. 5 and 7, meshes with the three gears 42R, each of which in turn drivingly engage two of the gears 40R.

The carriage 36R as shown in the Figs. 1, 2 and 7 supports a plurality of drill heads 60R upon its outer periphery, equally spaced from each other. Each drill head comprises a housing 61R supported upon the carriage so as to move longitudinally thereof. These housings 61R have oppositely disposed feet 59R which fit in channels formed by guideways 62R secured to the carriage by the clamp plates 63R screwed to the carriage. At each end of each drill head housing 61R there is provided a roller bearing 64R rotatably supporting a hollow shaft 65R. Within the housing 61R the hollow shaft carries a gear 66R so as to rotate with said shaft, this gear in turn meshing with the adjacent gear 40R supported by the shaft 39R of the carriage. The end of the hollow shaft 65R, more adjacent the center line 20 of the machine, is split, having a clamping screw collar 67R provided thereon which is adapted to control the collet 68R which holds the drill 69R of the drill head. Each drill of every drill head has a straight portion 70R for cutting a hole in the workpiece and a tapered portion 71R for counter-sinking the hole.

Within the annular camming slot 34R of the ring 32 there are provided a plurality of cam followers 72R, one for each drill head. Each cam follower is rotatably carried by a stud 73R the head portion of which fits into a slide member 74R. An adjusting rod 75R has one end anchored in the drill head housing 61R, the other end of the rod extending slidably through a passage in the slide member. Adjusting nuts on the rod 75R permit the position of the drill head relative to its respective cam follower to be altered. From this it may be seen that each drill head is operatively connected with a cam follower 72R in the annular cam slot 34R. The means connecting the drill head with the cam follower is adjustable so that the position of the drill head relative to its cam follower may be adjusted by the operation of the nuts on the screw-threaded rod 75R whereby compensations may be made when new drills are placed within the drill head.

The space between the inner corresponding walls 37R and 37L of the oppositely disposed carriages 36R and 36L contains the hub member 50 of the machine which, as has been described rotates in unison with said two carriages due to the studs 48 connecting said hubs to said carriages.

Referring particularly to the Figs. 5, 6, 10 and 11, the hub member 50 is shown comprising a center body portion 80 having spaced radial arms 81. Spaces 82 are formed between adjacent radial arms in which the work holders and their operating members are provided. On each side of the central body portion 80 of the hub member 50 there is provided a triangularly shaped recess, the one on the right side of the center line 20 being designated by the numeral 83R and on the left side of the center line by the numeral 83L. The Fig. 6 clearly illustrates the recess 83R. Alternate radial arms 81 of the hub member 50 have ducts 84 which communicate with the recess 83R, said ducts terminating in the outer peripheral wall of said radial arms. Similar ducts in the other alternate arms 81 of the hub member 50 lead from the recess 83L to the outer peripheral surface of these respective radial arms on said hub member. On each side of the hub member 50 there is a screw threaded opening communicating with the respective recesses 83R and 83L, these openings receiving a nipple 85R and 85L respectively. An opening in the nipple 85R coaxial with the hub member 50 screw-threadedly receives one end of a pipe 86R, this pipe passing through the tubular shaft 52R and through the bushing 27R to the outside of the machine where it connects with a rotating joint 87R having the stationary pipe 88R also connected thereto. Pipe 88R leads to a force pump 89 which is adapted to force lubricant through the pipe 88R and the rotating joint 87R into the rotating pipe 86R and thence into the recess 83R and from said recess through duct 84 to the coupling 90, one of which is screw threaded into each one of the ducts 84 provided in the radial arms of the hub member. A similar pipe 86L is provided in the left hand side of the machine connecting with a rotating joint 87L which has the feed pipe 88L connected thereto leading from the lubricant force feed pump 89 and thus directing lubricant to the recess 83L and to the ducts radiating therefrom.

The hub member 50 carries bearing rings 90R and L, one on each side the center 20 of the machine, each bearing ring in turn supporting an annular member 91R and L respectively. The outer edges of each of these annular members engage with the respective walls of their adjacent carriages and, being carried by the bearing rings 90R and L which tend to rotate with the hub member 50, these annular members have a tendency to rotate therewith. At the inner end of each annular member there is provided an internal camming face 92, the contour of this camming face being clearly shown in the Fig. 6. At the outer edges of the annular members an internal gear 93 is provided, the teeth of this internal gear being of a similar pitch as the internal gear 35R and 35L of the respective rings 32R and 32L. The camming surfaces 92 are provided for operating the chucks so that they will be opened and closed at proper stations in the cycle of machine operation. To do this it becomes necessary to prevent rotation of the annular members 91R and L and thus there is provided in each carriage spaced shafts 95, rotatably journalled in each carriage 36R and 36L. Similar pinions are attached to each end of each shaft, the pinions at the ends of the shafts closer to the center of the machine being designated by the numeral 96 and meshing with the internal gear 93 of the annular members 91R and L, while the gears more remote from the center of the machine, or at the opposite end of shafts 95, are designated by the numerals 97 and mesh with the internal gears provided on stationary ring members 32R and L. Thus the shafts 95 and their respective gears 96 and 97 may be termed "traveling connections" between similar internal gears, of which 32R and L are stationary and the other 93 being of similar dimensions and having a tendency to rotate, but being held non-rotative due to this connection with the stationary internal gear.

It has been mentioned heretofore that spaces 82 between adjacent radiating arms 81 of the hub member form chambers in which the work holders or chucks and their control mechanisms are contained. The annular members 91R and L support a collar comprising two oppositely disposed disc portions 100R and 100L which fit rotatably upon the outer peripheral surface of inwardly extending flanges provided on said annular members. These two disc portions 100 form a collar and are held in spaced relation by spacing rolls 101 arranged in a circular row so that radial lines passing from the center of the machine through the center of each drill head 60, carried by the respective carriages, will intersect the axis of a spacing member 101. The work holders or chucks comprise oppositely disposed lever jaws 102 pivotally carried on shafts 103 interposed between the annular discs 100R and L. The ends of these pivotal levers opposite the jaws 102 each have a conecting link 108 pivotally secured to a plunger 104 slidably supported in a recess 105 provided in the hub member 50. A spring 106 in the recess 105 normally urges the plunger 104 out of said recess and thus the levers carrying jaws 102 have their inner ends forced outwardly, resulting in a closing of the jaws 102 whereby the workpiece 107 in the form of a pin in this instance is gripped between the jaws 102. The spacing members 101 acting also as a supporting hinge pin between the jaw levers having its center intersected by a radial line of the machine also intersecting a drill head will substantially bring the center of the pin or workpiece 107 in alignment with the drills 69R and L of the corresponding drill heads so that said drills may cut a hole through the shaft of the pin 107 in proper position. Each plunger 104 has a cross shaft 109 extending from each side of said plunger, the ends of said cross shaft 109 having cam following rolls 110 provided thereon which are maintained in engagement with the camming surfaces 92 of the annular members 91R and L by the springs 106. Thus it may be seen that as the rotor 50 rotates relative to the stationary annular members 91R and L, cam followers 110 moving over the deviating cam surfaces 92 of said annular members will move the plungers 104 in the respective recesses 105 and thereby operate the jaw levers whereby the work holders or chucks will be opened and closed at proper stations and intervals in the cycle of machine operation.

Figure 6:
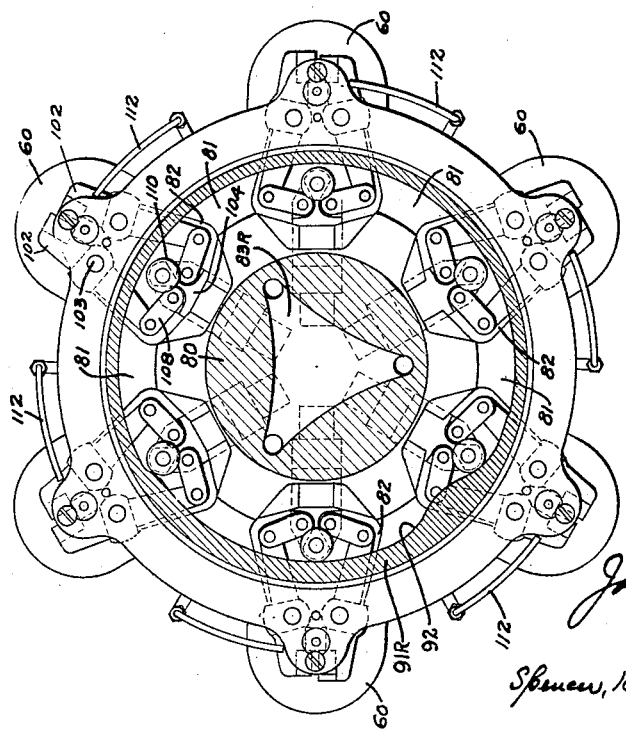
Fig. 6 is a transverse sectional view taken substantially along the line 6—6 of Fig. 5.

As shown in Fig. 6 a chuck is provided between each corresponding and aligned pair of drill heads of the respective carriages 36R and L. Camming surfaces 92 are so arranged that the chucks will be brought to grip the work at which time the drilling operation occurs and then said chuck will be opened widely during another portion of the machine operation whereby the work may drop from the chuck and then at another portion of the cycle of operation the chuck is close to the work receiving position where the operator may insert a workpiece or pin 107 into the chuck, said workpiece again being gripped at a point further on in the cycle of machine operation.

The couplings 90 have U-shaped pipes 112 leading therefrom, one branch of each U-shaped pipe directing a flow of fluid upon one side of the work holding chuck, the other branch upon the other side of said chuck whereby fluid is fed directly upon the workpiece in the chuck while the drills are cutting the holes therein. It will be understood of course that these feed pipes 112 are mounted upon and rotate with the hub assembly.

The cam slots 34R and 34L of the rings 32R and 32L respectively are of such a conformation that both drill heads are moved substantially concurrently toward the chuck whereby the hole through the workpiece is cut from both sides substantially concurrently. In order to prevent meeting of the drills in the workpiece the one cam moves its row of drill heads so that within the proper time these drills will cut a hole into the workpiece past the center thereof and then start to withdraw said drills before the drills of the opposite carriage drill heads reach the center of the workpiece. The said other drills will not cut their holes to communicate with the holes cut by the first mentioned drills before said first mentioned drills are partly withdrawn from their holes in the workpiece. Thus a meeting of the drills, which would cause damage, is substantially prevented.

Oilers 120 are provided in each end of the machine directing lubricant through the channels 121, 122 and 123 to the bearings and into the chamber 55R from whence the lubricant may flow through the channels 125, 126 and 127 to other portions of the machine requiring lubrication. Oiling of the left side of the machine occurs in a similar manner.

Figure 8:
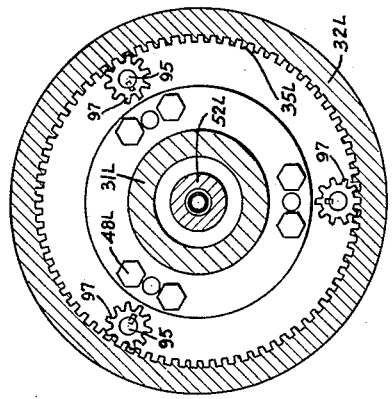
Fig. 8 is a transverse sectional view taken along the line 8—8 of Fig. 5, certain exterior parts being omitted for the sake of clearness.
Figure 9:
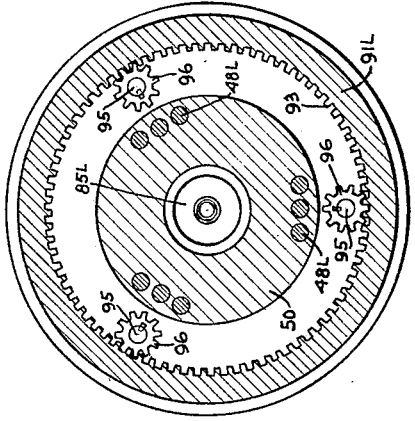
Fig. 9 is a transverse section taken along the line 9—9 of Fig. 5, parts outside the hub member of the machine being omitted for the sake of clearness.
Figure 4:
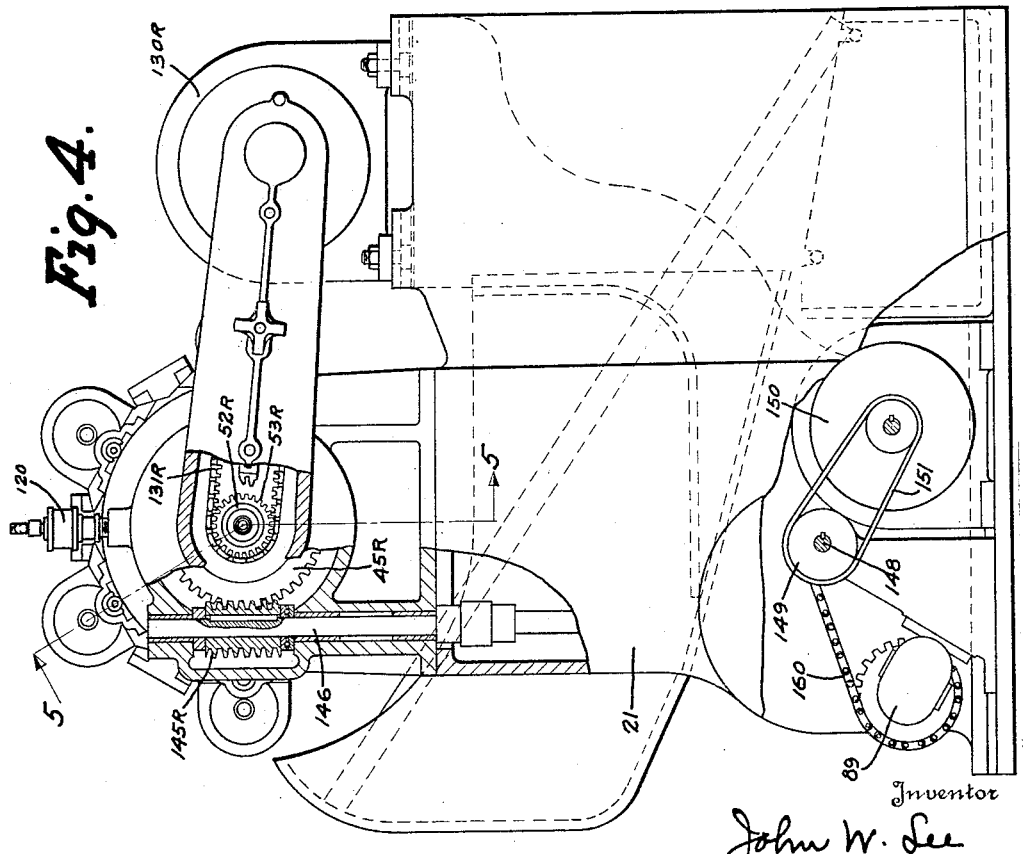
Fig. 4 is an end view of the machine with a portion of the casing broken away to show interior construction.

The Fig. 2 illustrates the motors 130R and L, the motor 130R being drivingly connected with the sprocket 53R through the chain connection 131R (see Fig. 4) whereby said motor drives the tubular shaft 52R which, as has been described, is operatively connected with the gears 66R adapted to drive the drills within the drill heads carried by the carriage 36R. In a similar manner motor 130L will drive all of the drills carried in the drill heads supported by the carriage 36L. In the Figs. 3 and 4 the method of driving the hub member between the carriages is clearly illustrated. As has been mentioned, the hollow shafts 31R and L which drive the carriages are provided with gears 45R and L. Each one of these gears are driven by a worm 145R and L respectively supported on a shaft 146 which in turn has a gear 147 thereon meshing with a worm not shown in the Fig. 3, but carried by the drive shaft 148 which also carries the sprocket wheel 149. Sprocket wheel 149 is driven by the motor 150 through chain 151 and thus motor 150 drives the shaft 146 which carries worm 145 meshing with the gear on the hollow shaft, said shaft being operatively connected with the respective carriage 36R. The shaft 148 extends to both sides of the machine, the connections between this shaft and the respective gears 45R and L being the same. The lubricant force feed pump 89 is driven by a chain 160 operatively connected with a sprocket on drive shaft 148. A handle 161 is provided on the frame of the machine adapted to be moved into operating engagement with the drive shaft 148 whereby the attendant may turn the machine in order properly to position the drill heads thereon. In Fig. 2 lines 150R and L are provided on the machine for machine setting purposes. To set the drill in proper position relative to the work the operator turns the handle 161 until one of the right drill heads coaxially aligns with said line 150R at which time its drill should begin to engage the work. By aligning the left drill heads with the line 150L the respective drills of the drill heads aligning with this line should begin to touch the workpiece. If these adjustments are thus made, further operations of the machine will follow without danger of breakage.

Figure 12:
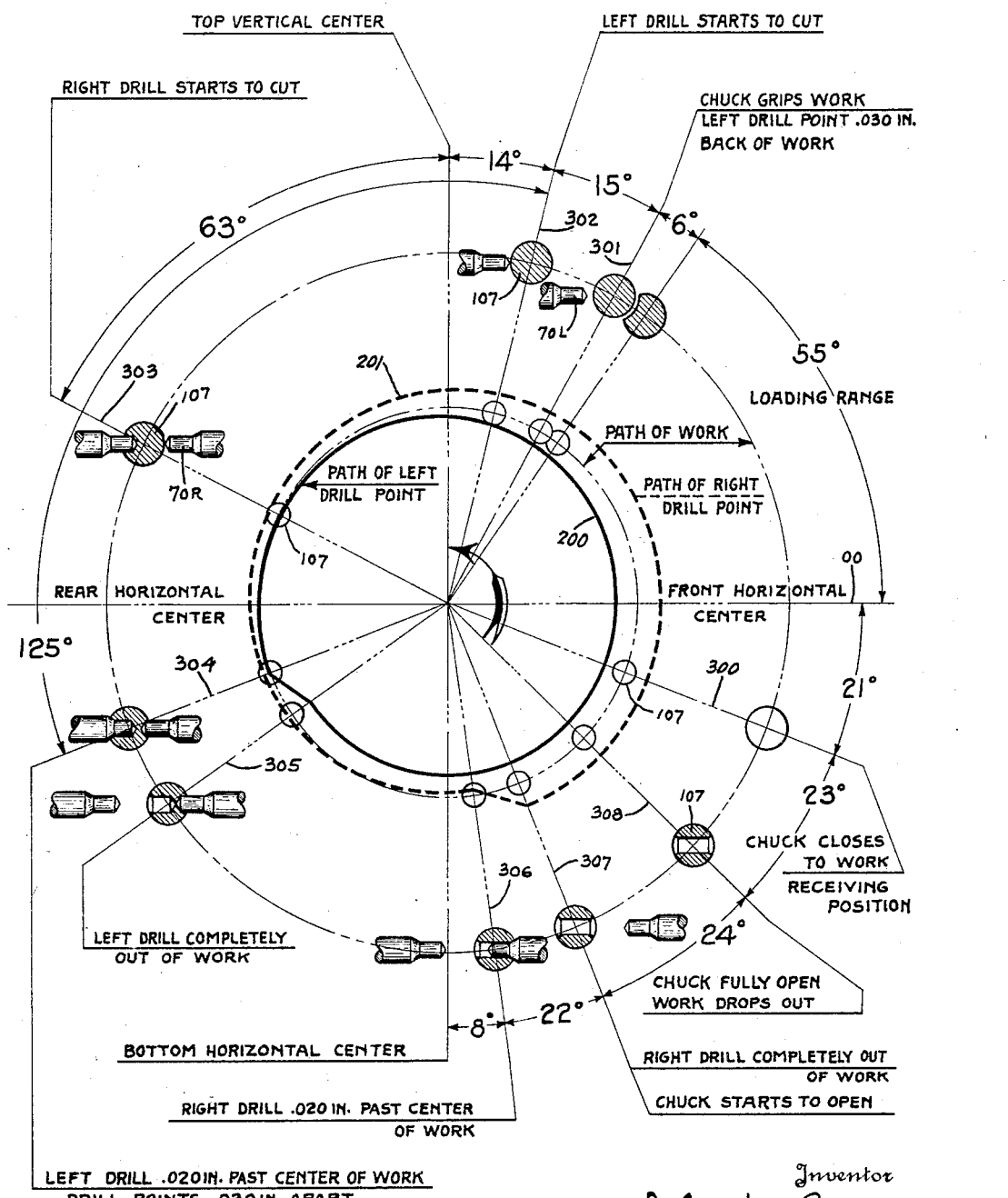
Fig. 12 is a diagrammatic view showing the relative position of the drill members to the work piece at different points in the cycle of machine operation.

The various operations of the drill heads have been graphically shown in the Fig. 12. The full line curve designated by the numeral 200 illustrates the path of movement of the left drill points while the dotted line curve 201 illustrates the path of movement of the right drill point. About these two lines 200 and 201 are shown the workpieces in their path of movement and two cooperating drills in their relative positions at various points in the cycle of machine operation. Starting at the radial line 300 it will be seen that the chuck closes at this point to work receiving position. As the chuck moves from the front horizontal line 00 through 55 degrees, the operator may load the chuck by inserting the workpiece therein, this being termed the "loading range" of the machine. At the point indicated by radial line 301, the workpiece is gripped by the chuck and when the machine reaches the line 302 the left drill engages the workpiece and starts to cut while the right drill is still spaced from the workpiece. When the machine has rotated to the line 303, then the left drill has cut its way into the workpiece and the right drill just engages the work and starts to cut. At the line 304 the left drill has cut into the work substantially beyond the center thereof, practically reaching the limit of its cutting operation. The right drill, as may be seen, has cut its way partially into the workpiece, however a clearance of at least .030 of an inch exists between drill heads. While the machine is moving from the line 304 to the line 305, the left drill will be moved out quickly by camming slot 34L as shown by the line 200, the right drill still moving inwardly to cut its hole so as to communicate with the hole completed by the left drill. At the line 306 the right drill has completed its cutting operation and at 307 it will be moved out of the workpiece by the camming slot 34R so that at this point the workpiece has its hole completely drilled therethrough and as shown in this figure is chamfered at both ends. At the line 308 the chuck opens widely, permitting the work to fall out of the chuck and through a proper guideway directed to the finished work receptacle. At the line 300 this chuck will again close.

It will be seen that the machine being provided with twelve drill heads is capable of replacing twelve ordinary drill presses and being of an entirely automatic character, requires an attendant only for loading purposes.

While the form of embodiment of the present invention as herein disclosed, constitutes a preferred form, it is to be understood that other forms might be adopted, all coming within the scope of the claims which follow.

What is claimed is as follows:

1. A machine for drilling a hole through a piece of work and chamfering each end of the hole comprising, in combination, two spaced, stationary end frames; a bearing sleeve attached to and extending from each end frame, said bearing sleeves being coaxially aligned; a ring about each bearing sleeve clamped upon the respective frame by said sleeve, each ring having an internal gear at its end more remote from the frame and an annular cam slot in its outer peripheral surface; a carriage rotatably supported upon each ring; a driving member journalled in each bearing sleeve and attached to the carriage on the ring of the respective frame; a plurality of drill heads on each carriage, equally spaced and movable longitudinally thereto, each drill head having a rotating drill extending toward the drill head on the opposite carriage, corresponding drill head on the respective carriages being in coaxial alignment; a hub member supported between the two carriages; means attaching the hub member to said carriages so that they all rotate in unison; bearing rings about said hub member; annular members upon said bearing rings, the edges thereof engaging the respective carriages tending to rotate said annular members; internal camming surfaces in said members; an internal gear in each one of said members, similar to the internal gear of the rings attached to the end frames; shafts rotatably carried by the carriages; similar pinions at the ends of the shafts, meshing respectively with the internal gears of the stationary ring and an annular member adjacent thereto thus maintaining said annular members non-rotative; a collar rotatably supported upon the annular members; work holders on said collar, one between each two corresponding drill heads; means operatively connecting the collar with the hub member so that the two rotate together; said means having provisions engaging the camming surfaces of the two annular members which operate the work holders; cam followers in the annular cam slot of each ring carried by a bearing sleeve; means connecting each drill head with a cam follower whereby aligned drill head on the respective carriages are moved toward each other substantially concurrently the camming slot of the one, however, moving it so that its drill cuts its hole and begins to retract before the drill of the opposite head cuts its hole to communicate with the said first drilled portion thereof.

2. A machine for drilling a hole in a piece of work comprising, in combination, two oppositely disposed, stationary end frame members each having a cylindrical portion in coaxial alignment with the other; a bearing in each of said members; a hollow shaft journalled in each of said bearings, each shaft being provided with a driving gear; a flange on each of said shafts; a carriage rotatably supported by each end frame member; a plurality of drill heads on each carriage; a hub member supported between the two carriages said hub member having recesses on each side thereof and channels radiating from said recesses, said channels in turn communicating with ducts leading to the outer surface of said hub member; means operatively connecting the hub member with the carriages and the carriages with the flanges on the respective hollow shafts so that all will rotate together; bearing rings on the hub member; an annular member carried by each bearing ring; means for holding the annular members stationary; a ring rotatably carried by the annular members, a plurality of work holding chucks on said ring; tubes connecting with the respective ducts of the hub member and leading to the respective chucks to discharge lubricant upon the work held therein; a tubular shaft journalled within each hollow shaft; gearing operatively connecting the tubular shaft with the drill heads on the respective carriages; means for driving said tubular shafts; a nipple on each side of the hub member communicating with the recess therein; and a pipe within each tubular shaft, connected with the respective nipple each pipe being adapted to be exteriorly connected with a rotatable joint whereby lubricant is directed through the rotating pipes and nipples into the recesses and ducts of the hub member and through the tubes to the work pieces in the chucks.

In testimony whereof I hereto affix my signature.

JOHN W. LEE.